United States Patent

[11] 3,589,484

| [72] | Inventors | Edward J. Lammers;<br>Thomas F. Teter, both of Aurora, Ill. |
|---|---|---|
| [21] | Appl. No | 842,267 |
| [22] | Filed | July 16, 1969 |
| [45] | Patented | June 29, 1971 |
| [73] | Assignee | Caterpillar Tractor Co.<br>Peoria, Ill. |

[54] PARKING BRAKE CONTROL SYSTEM
3 Claims, 1 Drawing Fig.

[52] U.S. Cl. ................................................. 192/4 A,
192/13 R, 137/596
[51] Int. Cl. ....................................................... F16h 57/10
[50] Field of Search ......................................... 192/4 A,
13, 15, 12.1, 17.1

[56] References Cited
UNITED STATES PATENTS

| 2,703,162 | 3/1955 | Kiem et al. .................... | 192/12.1 |
| 2,904,146 | 9/1959 | Codlin .......................... | 192/4 A |
| 2,990,925 | 7/1961 | Bernotas ....................... | 192/4 A |
| 3,050,165 | 8/1962 | Day et al. ..................... | 192/4 A X |

*Primary Examiner*—Benjamin W. Wyche
*Attorney*—Fryer, Tjensvold, Feix, Phillips & Lempio

ABSTRACT: A control system for a vehicle having a parking brake and a transmission is provided with a valve arrangement which automatically places the transmission in a neutral condition when the parking brake is engaged.

PATENTED JUN 29 1971
3,589,484
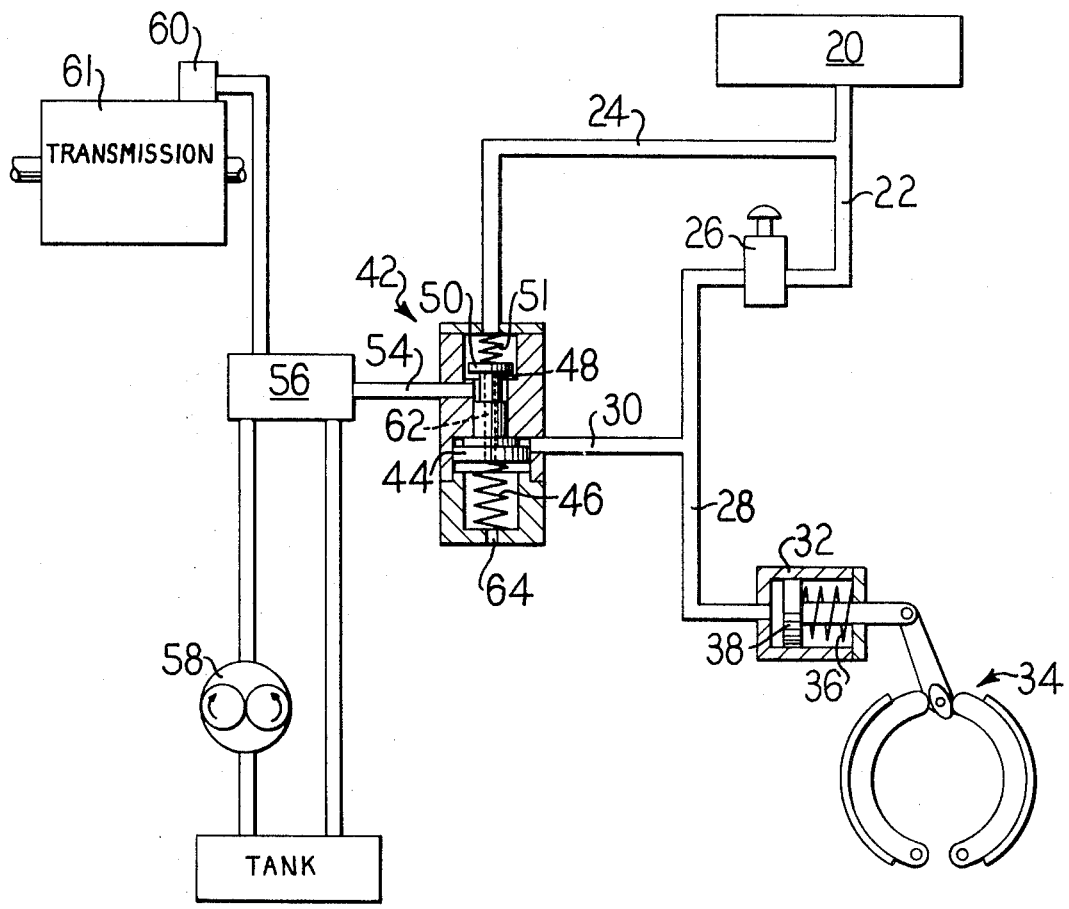
INVENTORS
EDWARD J. LAMMERS
THOMAS F. TETER
BY
ATTORNEYS

PARKING BRAKE CONTROL SYSTEM

BACKGROUND OF THE INVENTION

This invention relates to a control system employed on a vehicle for effecting automatic disengagement of the transmission upon application of the vehicle's parking brake. The control system also is adapted to reengage the transmission when the parking brake is released.

The invention is particularly applicable on machines having engines of sufficient torque to overpower the parking brake. Many present-day machines have warning devices, such as a dash-mounted indicator and/or a buzzer, which operate when the air pressure in the parking brake system is low, indicating that the parking brake is engaged. However, there are many situations where the operator either is not aware that the warning devices are on or has chosen to ignore the warning devices and has driven the machine with the parking brake applied. The resulting heat buildup soon destroys the parking brake lining, thereby making it useless as a backup or emergency brake.

Accordingly, it is the principal object of the present invention to provide a control system which will automatically place the transmission of the vehicle in a neutral condition whenever the parking brake is engaged, and also reengage the transmission when the parking brake is released.

Other and further objects and advantages of the present invention will be apparent from the following description and claims and are illustrated in the accompanying drawing which, by way of illustration, shows preferred embodiments of the present invention and the principles thereof, and what are now considered to be the best modes contemplated for applying these principles. Other embodiments of the invention embodying the same or equivalent principles may be used and structural changes may be made as desired by those skilled in the art, without departing from the present invention and the purview of the appended claims.

BRIEF DESCRIPTION OF THE DRAWINGS

The drawing is a schematic view of the parking brake control system and wherein certain components of the control system are shown in cross section.

DETAILED DESCRIPTION OF THE PREFERRED EMBODIMENT

As shown in the drawing, a suitable air source 20 contains pressurized air for delivery to a pair of conduits 22 and 24. The conduit 22 communicates with a hand-actuated control valve 26, which is normally open to deliver air to a conduit 28 and a branch conduit 30. The conduit 28 communicates with a spring-loaded cylinder 32 which is operable to actuate a conventional parking brake 34 by means of a spring 36 which urges a piston 38 to the left to engage the brake when air is evacuated from the head end of the cylinder 32. However, the control valve 26 is normally open to direct pressurized air from the air source 20 through the conduit 28 to the head end of cylinder 32, thereby compressing the spring 36, which releases the parking brake 34. As will be better understood from the later description, the brake 34 is applied by closing the valve 26 which blocks air from the air source 20 and exhausts air in the cylinder 32.

The system also includes an inversion valve 42. Airflow through the inversion valve 42 is controlled by a piston or spool 44 which is urged to the position shown by spring 46. When the piston 44 is urged to the position shown, a rod extension 48 of the piston unseats a spring-actuated flat valve 50. Unseating of valve 50 allows airflow between the conduit 24 and a conduit 54.

The conduit 54 communicates with a neutralizer valve 56. When air pressure is applied to the neutralizer valve, a valve spool (not shown) in the neutralizer valve interrupts the flow of fluid pressure from a pump 58 and releases the pressure from a control 60 which neutralizes a transmission for the vehicle shown at 61.

When the control valve 26 is closed the air supply from conduit 22 is blocked off from the branch conduit 30 and the conduit 28. This permits the spring 36 to actuate the parking brake 34 and also permits the spring 46 to actuate the inversion valve 42 to the position shown, which in turn neutralizes the transmission through actuation of the neutralizer valve 56 via air pressure passing from the source 20 through the conduits 24 and 54.

When the control valve 26 is actuated to direct air through conduit 28 the piston 38 is moved to the right, overcoming the bias of spring 36, which disengages the parking brake 34. Actuation of the control valve 26 also directs air through the branch conduit 30 which communicates air pressure to the upper side of piston 44, causing it to move downwardly and allowing a spring 51 to seat the valve 50, which blocks airflow between conduit 24 and conduit 54.

When the piston 44 is moved to its lower position, a space is provided between the lower surface of valve element 50 and the rod extension 48 of the piston. This space allows air to exhaust from the neutralizer valve 56 through the conduit 54 and down through a passage 62 which extends through the piston 44. The exhausted air passing through passage 62 is finally exhausted to the atmosphere through a bore 64 formed in the base of the housing of valve 42. Exhausting the air from the valve 56 in the manner just described causes the transmission to be reengaged.

From the description, it will be understood that when the parking brake 34 is engaged, the transmission 61 is automatically placed in a neutral condition by means of air pressure which activates the neutralizer valve 56. Conversely, when the parking brake 34 is disengaged, the inversion valve 42 exhausts air from the neutralizer valve 56 so that the transmission is reengaged.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a system for a vehicle having a transmission, an air controlled parking brake and an air actuated neutralizer valve means for automatically engaging and disengaging the transmission, the combination comprising:
    a source of air under pressure;
    manually operable valve means movable to a first position which blocks air from the parking brake and permits mechanical means associated with the parking brake to automatically engage the parking brake, said manually operable valve means simultaneously directing air to the neutralizer valve means to disengage the transmission;
    said manually operable valve means movable to a second position to direct air under pressure to the parking brake to overcome the mechanical means and disengage the parking brake, said manually operable valve means simultaneously exhausting air from the neutralizer valve means to thereby allow said neutralizer valve means to automatically move to a transmission engaging position.

2. A system for a vehicle having a parking brake, a transmission and a neutralizer valve means which neutralizer valve means may be actuated by air pressure to automatically place the transmission in a neutral condition, the combination comprising:
    a source of air under pressure;
    a load cylinder having a spring normally urging a first face of a piston in a first direction to engage a parking brake;
    first conduit means interconnecting the air source and the load cylinder;
    manually operable first valve means movable to a first position which communicates air pressure through the first conduit to a second face of the piston in the load cylinder to overcome the load cylinder spring force and move the piston in a second direction which disengages the parking brake;

said first valve means movable to a second position which blocks fluid communication between the air source and the load cylinder, thereby permitting the load cylinder spring to move the piston in a direction which engages the parking brake;

inversion valve means in communication with both the first valve means and the neutralizer valve means; and said inversion valve means operable to supply air to the neutralizer valve means when the first valve means is in said second position and to exhaust air from the neutralizer valve means when the first valve means is in the first position.

3. In a system for a vehicle having a parking brake, a transmission and a neutralizer valve means which neutralizer valve means may be actuated by air pressure to automatically place the transmission in a neutral condition, the combination comprising:

a source of air pressure;

a load cylinder having a spring-actuated piston for engaging a parking brake;

first conduit means communicating the source of air with an opposite side of the spring-actuated piston;

first valve means in said first conduit means normally open to permit air pressure from the source to overcome the spring bias and move the piston to maintain the parking brake in a released condition;

second valve means in communication with the first valve means and operable to prevent air pressure from the source from actuating the neutralizer valve means when the first valve means is in an open condition;

manual means for closing the first valve means to prevent communication of air pressure from the source to the spring-biased piston and thereby permitting the spring to move the piston and engage the parking brake;

said second valve means operable in response to closing of the first valve means to communicate air pressure from the source to the neutralizer valve means whereby the transmission of the vehicle is placed in a neutral condition when the parking brake is engaged.